Aug. 1, 1950

A. F. MacLEAN 2,517,006

CATALYTIC REACTION FOR THE PRODUCTION OF
UNSATURATED ALIPHATIC ALDEHYDES

Filed March 3, 1948

*INVENTOR.*
ALEXANDER F. MACLEAN.

BY
ATTORNEYS.

Patented Aug. 1, 1950

2,517,006

UNITED STATES PATENT OFFICE 2,517,006

CATALYTIC REACTION FOR THE PRODUCTION OF UNSATURATED ALIPHATIC ALDEHYDES

Alexander F. MacLean, Robstown, Tex., assignor to Celanese Corporation of America, a corporation of Delaware Application March 3, 1948, Serial No. 12,719

7 Claims. (Cl. 260—601)

This invention relates to the production of higher aldehydes and relates more particularly to the production of higher unsaturated aldehydes.

An object of this invention is to provide an improved and continuous process for the production of higher unsaturated aldehydes by the catalytic vapor phase reaction of formaldehyde with higher saturated aliphatic aldehydes, i. e. containing a greater number of carbon atoms, such as acetaldehyde.

Another object of this invention is to provide a process for the catalytic vapor phase reaction of formaldehyde with a higher saturated aliphatic aldehyde wherein the catalyst is maintained in a fluidized form during said reaction.

A further object of this invention is the provision of a continuous fluid catalytic process for the vapor phase reaction of formaldehyde with an aliphatic aldehyde whereby the fluidized catalyst is continuously cycled during said reaction and at least partially regenerated while moving through the system.

Other objects of this invention will appear from the following detailed description and the accompanying drawing.

In the drawing, the figure is a schematic view of an apparatus which may be employed in connection with the novel process of my invention.

It has heretofore bein proposed to produce unsaturated aliphatic aldehydes by reacting a mixture of formaldehyde and a higher saturated aliphatic aldehyde containing a greater number of carbon atoms than formaldehyde by passing the mixture in the vapor phase over a suitable, fixed catalyst bed. When formaldehyde is reacted with acetaldehyde, for example, the unsaturated aldehyde formed by the reaction comprises acrolein. In addition to acrolein, the vaporized reaction product contains some unreacted formaldehyde and acetaldehyde together with methanol, crotonaldehyde, higher unsaturated aldehydes, carbon monoxide and hydrogen, as well as some water. Certain tarry decomposition products are also formed and are deposited upon the particles of catalyst employed for effecting said reaction. Due to the deposit of said tars and other decomposition products on the surface of the catalyst particles forming the bed, the conversion per pass and the efficiency of the process gradually decreases. The resulting loss in efficiency requires that the process be operated intermittently so that the spent catalyst can be regenerated. Such discontinuous operations are quite undesirable if only from the standpoint of economy. Furthermore, the gradual loss in efficiency during the process requires constant attention in order to evaluate the instantaneous efficiency and to determine the optimum point at which the catalytic reaction cycle must be halted and the regeneration cycle commenced if the overall efficiency of the process is to be maintained at a satisfactory high level.

I have now found that unsaturated aldehydes may be obtained in excellent yield by a continuous process wherein formaldehyde is reacted with a higher saturated aliphatic aldehyde if the reaction is effected in the vapor phase employing a fluidized reaction catalyst and continuously regenerating and recycling the catalyst through the reaction system employed.

The catalyst preferably employed comprises finely-divided silica gel impregnated with from 0.1 to 5.0% by weight of the oxide of a metal such as manganese, lead, zinc or cadmium. Most advantageously, the catalyst should be in a sufficiently fine form to pass a 50 to 120 mesh screen. The reaction is preferably effected at the temperature of 200 to 450° C. employing a formaldehyde-aldehyde reaction mixture in which the mol ratio of the reactants in the mixture is maintained at from 1.0 to 3.0 mols of formaldehyde for each mol of acetaldehyde or other saturated higher aliphatic aldehyde employed and space velocities of 5 to 100. The space velocity is defined herein as the ratio of the volumes of reactants to the volume of catalyst in the reactor per minute, calculated under conditions of normal temperature and pressure, i. e. 20° C. and 760 mm. pressure. The formaldehyde is advantageously reacted in the form of a 10 to 50% by weight aqueous solution so that when the formaldehyde is vaporized the reaction mixture will contain an appreciable amount of water vapor as a diluent.

An important feature of the novel process of my invention resides in the fact that the fluidized catalyst employed is continuously regenerated as an inherent part of the reaction cycle. Regeneration is normally effected by subjecting the catalyst to the oxidizing action of a current of air or oxygen at a temperature of 300 to 500° C. The regeneration may be complete or may be only partial depending upon the amount of oxygen employed in effecting said regeneration. During the regeneration, under conditions of high temperature, with oxygen present, the tars or other carbonaceous deposits upon the catalyst particles are at least partially oxidized and removed therefrom, said materials being oxidized to form carbon dioxide, carbon monoxide and water vapor. The regenerated catalyst which is thus obtained is then recycled to the reaction zone. The desired amount of catalyst is introduced into the reaction system in the form of a mixture with the vaporized formaldehyde and saturated aliphatic aldehyde employed. The final catalyst-aldehyde reaction mixture is then passed into the reaction zone of the reactor employed.

I have found, furthermore, that a basic factor in maintaining the conversion and the efficiency of the process at a high and substantially constant level resides in carefully controlling the number of moles of oxygen introduced into the regenerator for regenerating the spent catalyst with respect to the number of moles of reactants introduced as the feed entering the reactor. For convenience, I employ the term "regeneration ratio" to describe this correlation, which term is defined as the number of mols of oxygen fed to the regenerator divided by the number of mols of reactants, exclusive of water, fed to the reactor during any given period of time.

Thus, regeneration ratios from about 0.02 to about 0.15 have been found to be most advantageous. Where higher regeneration ratios are employed, namely, above about 0.15, the results obtained are less satisfactory. This is due to the fact that the higher ratios introduce an excess of oxygen into the regenerator above that amount necessary to completely regenerate the spent catalyst by removing the tars and other deposits formed thereon during the catalytic reaction. At such higher regeneration ratios I have found that a part of the oxygen remains with the regenerated catalyst. Thus, when the excess oxygen is introduced into the reactor with the catalyst and the aldehyde reaction mixture it appreciably decreases both the efficiency and the yield of unsaturated aldehyde obtained. For the most advantageous results the regeneration ratio should be such that the off-gases from the regenerator contain not more than about 1 to 2% by volume of oxygen.

In order further to illustrate the novel process of my invention, reference may be had to the accompanying drawing wherein there is shown, more or less schematically, a suitable apparatus for carrying out said process. Various other modifications of said apparatus may also be employed.

Referring now to the drawing, a vaporized reaction mixture comprising formaldehyde and acetaldehyde in the desired molar ratio is introduced into the system through a feed pipe 1, mixed with a suitable amount of regenerated, active catalyst at 2 and the vapors, together with the finely-divided catalyst, are passed into a reactor 3. The reactor 3 is maintained at the desired reaction temperature by suitable heating means (not shown). The desired reaction takes place in reactor 3 as the mixture of aldehydes and catalyst particles move through the heated reaction zone. The gaseous reaction mixture formed, together with the finely-divided fluidized particles of catalyst, leaves reactor 3 and is introduced by means of a pipe 4 into a cyclone separator 5. The design of the cyclone separator 5 is such that a whirling motion is imparted to the mixture which is supplied thereto. The heavier catalyst particles are thrown outward against the walls of separator 5 due to the action of the centrifugal force acting thereon, and the spent catalyst 6 collects in a stand pipe 7 communicating with the base of said cyclone separator 5. The mixture of reaction vapors leaves cyclone separator 5 through a pipe 8 and is then passed into a suitable condenser (not shown). The condensed reaction mixture is separated into its several components by a suitable distillation operation, the unreacted formaldehyde and acetaldehyde recycled to the process, and any fixed gases vented.

The spent catalyst 6 is continuously regenerated. Regeneration is effected by continuously removing the spent catalyst 6 from the base of stand pipe 7 by means of a worm feed or other suitable take-off device generally indicated by reference numeral 9 driven by a motor 10. Worm feed take-off 9 drops the spent catalyst into a pipe 11 where a stream of preheated air picks up the finely-divided catalyst particles and blows them into a regenerator 12. The amount of air entering pipe 11 is carefully proportioned to the amount of fresh aldehyde feed mixture introduced into the system through pipe 1. Regenerator 12 is heated by suitable means (not shown) to the desired regeneration temperature. The oxidizing action of the air burns off any tars and carbonaceous deposits thus effecting a regeneration of the catalyst. The regenerated catalyst leaves regenerator 12 through a pipe 13 and is introduced into a second cyclone separator 14. The whirling motion imparted to the mixture of gases and solid catalyst particles throws the latter outwardly against the walls of separator 14 and the regenerated catalyst 15 is collected at the base of separator 14 in a stand pipe 16. The off-gases formed in regenerator 12 leaves cyclone separator 14 through a pipe 17 and are vented. The regenerated catalyst thus obtained is introduced into the reaction system, as heretofore described, where it mixes with the incoming feed in pipe 1. The introduction of the regenerated, active catalyst is effected by means of a worm feed or other suitable take-off device 18 cooperating with stand pipe 16. This feed mechanism is driven by a motor 19 which enables the rate of catalyst feed to be carefully adjusted to the rate at which the incoming vaporized feed mixture of formaldehyde and acetaldehyde is introduced. The regeneration of the catalyst is thus effected continuously and the necessary cyclical intermittent reaction of the prior art is entirely eliminated. Greatly improved efficiency and conversion rates are thereby attained.

In order further to illustrate my invention, but without being limited thereto, the following example is given:

*Example*

A mixture of 46% by weight aqueous formaldehyde and 98% by weight aqueous acetaldehyde containing said aldehydes in a ratio of 2 mols of formaldehyde for each mol of acetaldehyde in the aqueous mixture is vaporized and the vapors continuously fed into a suitable reactor heated to a temperature of 386° C. at a rate of about 175 parts by weight per hour. During the passage of the vaporized feed into the reactor 5250 parts by weight per hour of a finely-divided catalyst consisting of silica gel impregnated with 2% by weight of manganese oxide is simultaneously introduced and fluidized by the entering vaporized feed. The catalyst employed is ground to pass a 50 to 80 mesh screen. The space velocity of the reaction gases is 90 volumes of reaction gases per volume of catalyst in the reactor per minute at normal temperature and pressure, i. e. 20° C. and 760 mm. pressure, The vaporized reaction mixture is maintained in the reactor and in contact with the fluidized catalyst for a period of about 0.6 second. The mixture of fluidized catalyst particles and reaction vapors obtained is then passed into a cyclone separator where the spent catalyst is separated from the reaction vapors. The reaction vapors are removed and, after being condensed, are separated into the several components. The spent catalyst collects at the base of the cyclone separator from which it is removed at a rate equal to that at which the active regenerated catalyst is introduced, then mixed with sufficient air so that the ratio of the number of mols of oxygen in the air entering to the mols of reactants entering the reactor is equal to a regeneration ratio of 0.07. The mixture of air and spent catalyst is blown into a regenerator maintained at a temperature of 370° C. and the tarry materials or other deposits on the catalyst partially oxidized to form carbon dioxide, carbon monoxide and water. The mixture of fluidized, partially regenerated catalyst and regenerator reaction gases is then passed to a cyclone separator wherein the regenerated catalyst is separated and the gases remaining are vented. The vented off-gas from the regenerator contains about 12% by volume of carbon dioxide, 2% by volume of carbon monoxide, 1.2% by volume of oxygen and about 14% by volume of water, the remainder being inert gases, such as nitrogen. The regenerated, active catalyst is then returned to the reactor with the incoming vaporized feed, as described.

At the end of 5 hours of continuous operation the conversion to acrolein per pass, based on the acetaldehyde in the incoming feed, is 36%. The conversion drops to about 31% at the end of 10 hours of continuous operation and rises again to a value of about 32% at the end of 15 hours. This conversion rate per pass then remains constant. When this equilibrium condition is reached the efficiency of the process based on the acetaldehyde is 74% while the efficiency based on the formaldehyde is 66%.

The conversion per pass may be defined as that proportion of the reaction mixture which undergoes reaction during a single pass through the reactor while the efficiency is defined as the amount of the reacted material which forms the desired product, i. e. acrolein, in the present instance. Thus, conversion per pass based on acetaldehyde is the amount of acetaldehyde undergoing reaction for each pass through the system while the efficiency based on the acetaldehyde is the amount of acrolein obtained from that amount of acetaldehyde actually reacted as compared to the amount theoretically obtainable. My novel catalytic reaction process may be operated for an indefinte period with the conversion per pass based on acetaldehyde averaging about 34%. The efficiency based on the acetaldehyde may be maintained at an average of as high as 80% while that based on the formaldehyde may be maintained at an average of 65%.

It is to be understood that the foregoing detailed description is given merely by way of illustration and that many variations may be made therein without departing from the spirit of my invention.

Having described my invention, what I desire to secure by Letters Patent is:

1. Process for the production of unsaturated aliphatic aldehydes, which comprises reacting a mixture of formaldehyde and a higher saturated aliphatic aldehyde in the vapor phase in a reaction zone and in the presence of a finely-divided catalyst for said reaction while maintaining the finely-divided catalyst in a fluidized state, separating the finely-divided catalyst from the reaction vapors containing the unsaturated aldehyde, at least partially regenerating the catalyst by reacting the same with oxygen in a regeneration ratio of 0.02 to 0.15 at an elevated temperature and then recycling the regenerated catalyst to said reaction zone together with a fresh vaporized mixture of formaldehyde and a higher saturated aliphatic aldehyde.

2. Process for the production of unsaturated aliphatic aldehydes, which comprises reacting a mixture of formaldehyde and a higher saturated aliphatic aldehyde in the vapor phase in a reaction zone at a reaction temperature of 200 to 450° C. and in the presence of a finely-divided catalyst for said reaction, while maintaining the finely-divided catalyst in a fluidized state, separating the finely-divided catalyst from the reaction vapors containing the unsaturated aldehyde, at least partially regenerating the catalyst by reacting the same with oxygen in a regeneration ratio of 0.02 to 0.15 at an elevated temperature and then recycling the regenerated catalyst to said reaction zone together with a fresh vaporized mixture of formaldehyde and a higher saturated aliphatic aldehyde.

3. Process for the production of unsaturated aliphatic aldehydes, which comprises reacting a mixture of formaldehyde and a higher saturated aliphatic aldehyde in the vapor phase in a reaction zone at a reaction temperature of 200 to 450° C. and in the presence of a finely-divided catalyst comprising silica gel impregnated with the oxide of a metal selected from the group consisting of manganese, zinc, lead and cadmium, while maintaining the finely-divided catalyst in a fluidized state, separating the finely-divided catalyst from the reaction vapors containing the unsaturated aldehyde, at least partially regenerating the catalyst by reacting the same with oxygen in a regeneration ratio of 0.02 to 0.15 at an elevated temperature and then recycling the regenerated catalyst to said reaction zone together with a fresh vaporized mixture of formaldehyde and a higher saturated aliphatic aldehyde.

4. Process for the production of acrolein, which comprises reacting a mixture of formaldehyde and acetaldehyde in the vapor phase in a reaction zone and in the presence of a finely-divided catalyst for said reaction, while maintaining the finely-divided catalyst in a fluidized state, separating the finely-divided catalyst from the reaction vapors containing the acrolein, at least partially regenerating the catalyst by reacting the same with oxygen in a regeneration ratio of 0.02 to 0.15 at an elevated temperature and then recycling the regenerated catalyst to said reaction zone together with a fresh, vaporized mixture of formaldehyde and acetaldehyde.

5. Process for the production of acrolein, which comprises reacting a mixture of formaldehyde and acetaldehyde in the vapor phase in a reaction zone at a reaction temperature of 200 to 450° C. and in the presence of a finely-divided catalyst for said reaction while maintaining the finely-divided catalyst in a fluidized state, separating the finely-divided catalyst from the reaction vapors containing the acrolein, at least partially regenerating the catalyst by reacting the same with oxygen in a regeneration ratio of 0.02 to 0.15 at an elevated temperature and then recycling the regenerated catalyst to said reaction zone together with a fresh, vaporized mixture of formaldehyde and acetaldehyde.

6. Process for the production of acrolein, which comprises reacting a mixture of formaldehyde and acetaldehyde in the vapor phase in a reaction zone at a reaction temperature of 200 to 450° C. and in the presence of a finely-divided catalyst comprising silica gel impregnated with the oxide of a metal selected from the group consisting of manganese, zinc, lead and cadmium, while maintaining the finely-divided catalyst in a fluidized state, separating the finely-divided catalyst from the reaction vapors containing the acrolein, at least partially regenerating the catalyst by reacting the same with oxygen in a regeneration ratio of 0.02 to 0.15 at an elevated temperature and then recycling the regenerated catalyst to said reaction zone together with a fresh, vaporized mixture of formaldehyde and acetaldehyde.

7. Process for the production of acrolein, which comprises reacting a mixture of formaldehyde and acetaldehyde in the vapor phase in a reaction zone at a reaction temperature of 200 to 450° C. and in the presence of a finely-divided catalyst comprising silica gel impregnated with 0.2 to 5.0% by weight of manganese oxide, while maintaining the finely-divided catalyst in a fluidized state, separating the finely-divided catalyst from the reaction vapors containing the acrolein, at least partially regenerating the catalyst by reacting the same with oxygen in a regeneration ratio of 0.02 to 0.15 at an elevated temperature and then recycling the regenerated catalyst to said reaction zone together with a fresh, vaporized mixture of formaldehyde and acetaldehyde.

ALEXANDER F. MacLEAN.

REFERENCES CITED

The following references are of record in the file of this patent:

UNITED STATES PATENTS

| Number | Name | Date |
|---|---|---|
| 2,245,582 | Gallagher et al. | June 17, 1941 |

OTHER REFERENCES

Kalbach, "Chemical & Metallurgical Engineering," June 1944, pages 94–98.